Patented Dec. 9, 1930

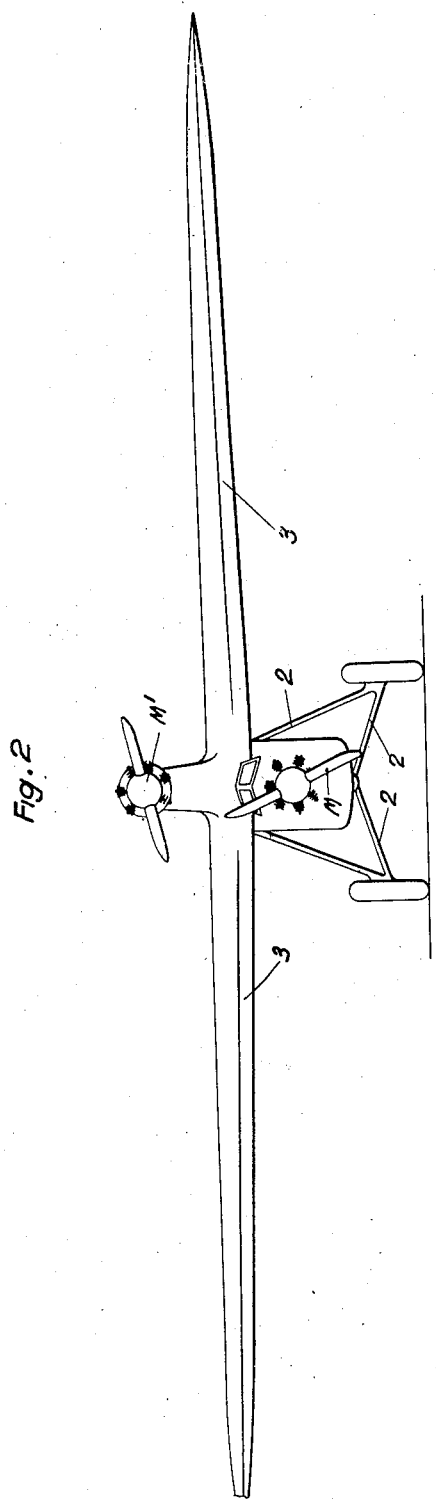
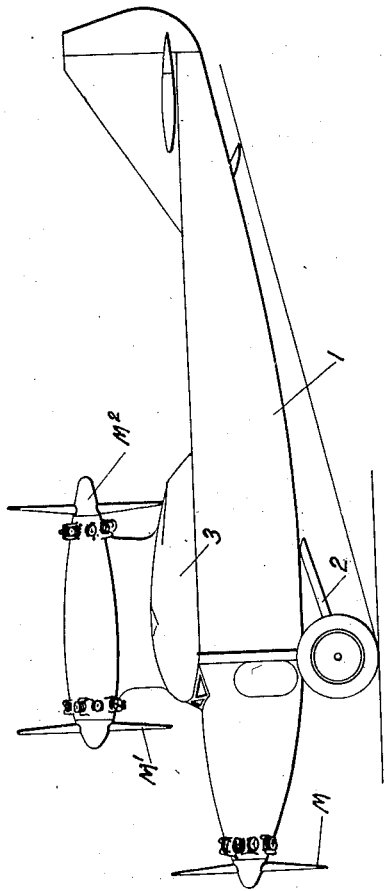

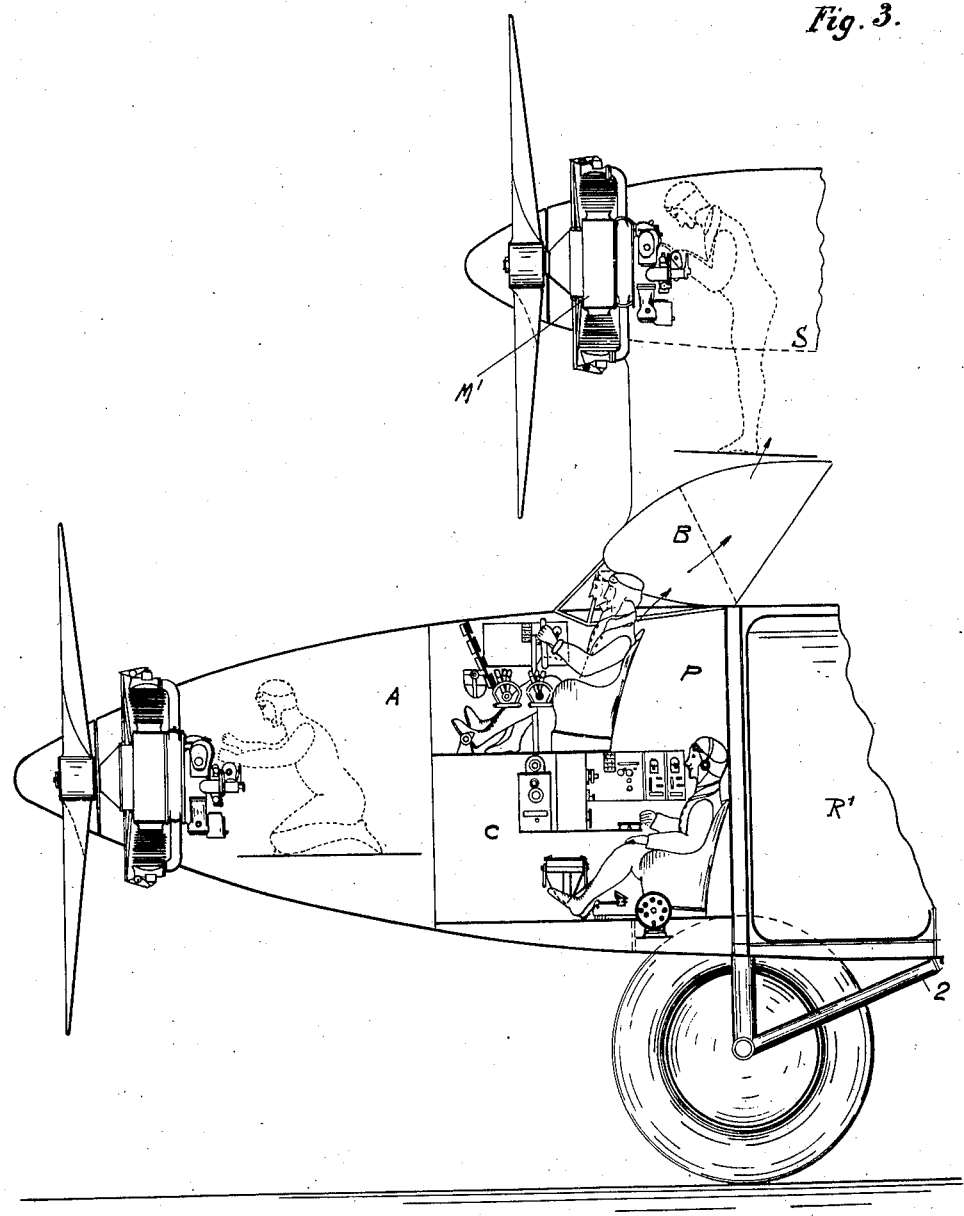

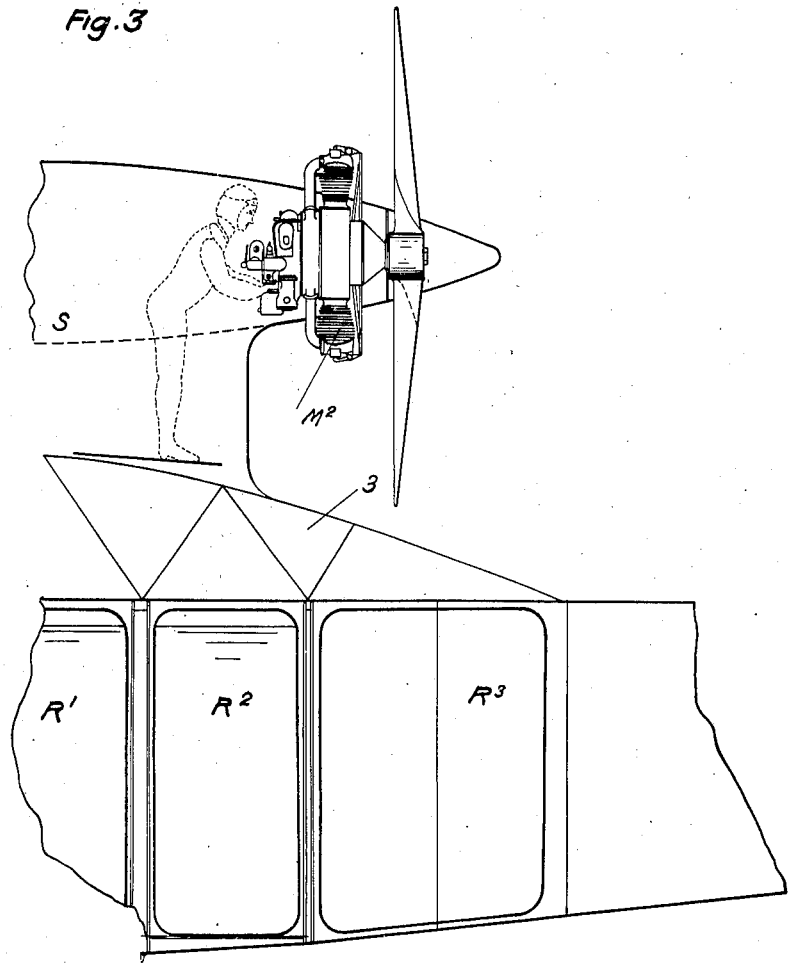

1,784,654

UNITED STATES PATENT OFFICE

ROMULUS BRATU, OF PARIS, FRANCE

AIRCRAFT

Application filed November 5, 1928, Serial No. 317,443, and in France November 12, 1927.

My invention relates to winged aircraft applicable to either biplanes or monoplanes and the object of the invention is to provide an arrangement in which safety in flight is greatly increased by employing three engines disposed in the vertical plane of symmetry of the craft, two of said engines being arranged in tandem above the plane of the craft and the third in front of the fuselage thereof in connection with monoplanes. In connection with biplanes two of the engines are arranged in tandem above the lower plane and a third is arranged in front of the fuselage.

By reason of distributing the three engines in the vertical plane no conflicting axial force is produced therebetween in the horizontal plane and the stopping of one of said engines does not in any way interfere with the steering of the craft, all of which constitutes a marked advance in the art.

Provision is made against axial displacement in the vertical plane, which amounts only to a secondary object of the invention, by an inclination of 8° toward the rear of the common axis of traction of the two upper engines. In this way the wind thrust from the two propellers thereof on the wing surface exactly balances their effective couple in whatever way the two upper engines may be working.

For the reasons above enumerated it is possible to fly with any one of the engines stopped, whether voluntarily at the end of a cruise at the time when unballasting due to consumption of fuel allows therefor, or accidentally, due to stopping, and even to fly with a single engine running.

I preferably also provide additional engines on each side of those in tandem, in order to increase the power of the craft.

A further object of the invention is to increase safety conditions while running by facilitating access to the engines during flight.

For this purpose the craft comprises a cabin enclosing the two upper engines, in which the mechanical members of the crew can constantly superintend the working of the engines and carry out any necessary supervision or repairs. The forward engine is also accessible during flight. In other words, the fuel pumps, magnetos, spark plugs, carburettors and all conduits are at all times entirely accessible and in a position to be repaired by a mechanic on board. This cabin is provided, when air-cooled engines are employed as well as when water-cooled engines are employed.

In the drawing—

Fig. 1 is a side elevation of the aircraft;

Fig. 2 is a front elevation; and

Fig. 3 is a side elevation on a larger scale with parts broken away to show the interior of the craft.

Referring to the drawing more in detail, 1 is the fuselage of the aircraft provided with a landing gear 2 and a supporting plane 3. The said aircraft is provided with engines M, $M^1$, $M^2$, disposed in a vertical plane of symmetry. The engine M is placed in front of the fuselage 1, and the two others $M^1$ and $M^2$ are placed in tandem above the wind planes 3. In order to prevent axial displacement with respect to the vertical plane, the common axis of traction of the two engines $M^1$ and $M^2$ is inclined at an angle of about 8° towards the rear.

The general arrangement of the aircraft is shown in Fig. 3. The compartment C accommodates the navigator's seat as well as that of the wireless operator. The compartment A allows every facility for the necessary repairs to be undertaken by the mechanic in case of a breakdown of the engine M. Above the seat in compartment C, is the pilot's seat P with a passage B for gaining access to the upper cabin S. This latter cabin permits the mechanics to supervise the satisfactory working of the engines $M^1$ and $M^2$ and to carry out all necessary repairs such as changing spark plugs, adjustment of magnetos, and the like.

Finally, the fuselage includes a series of reservoirs for a supply of fuel and oil $R^1$, $R^2$, $R^3$, and so on, provided with pipes and level indicators. These reservoirs are provided for the equipment of a raiding craft carrying no commercial load. The craft, however, can be immediately transformed into a commercial craft by removing the reservoirs from the fuselage and by fitting passenger seats in their place.

When the craft is arranged for commercial purposes the passengers are placed in the fuselage below the wing plane. The pilot, the mechanic and the navigator with his wireless equipment are placed in the forward portion of the hull. The reservoirs for fuel are located in the central portion of the canvas casing, are easily visible, capable of being dismounted, of being repaired and of being cast loose. The said reservoirs are used whether the vessel is equipped for raiding or commercial purposes.

My invention has for one of its objects the construction of an aircraft combining a record radius of action without any commercial load, which is very safe during flight, which can be immediately transformed into a commercial vessel by the removal of the reservoirs from the fuselage and the fitting up of the compartment as a cabin for passengers. The form selected is that of a projecting carriage body of very elongated shape, allowing low consumption of petrol and consequently a large radius of action.

Each engine as described is easily accessible during full flight, in other words all the parts such as fuel pumps, magnetos, carburettors, spark plugs and all the pipes are at all times able to be examined and repaired by the mechanic on board.

The stopping of one or the other of the engines does not interfere in any way with the steering of the vessel, which represents a great advance as compared with the majority of machines known in the art. No axial displacement is produced in the horizontal plane between the engines. As regards displacement in the vertical plane, which is a matter of much less importance, as previously explained, it is counteracted by the inclination of 8° towards the rear of the common axis of traction of the two upper engines $M^1$ and $M^2$, as is standard practice in hydro-aeroplanes. In this way the draft from these two propellers upon the wing surfaces exactly balances their effectived couple whatever may be the working conditions of the two upper engines. For this reason, it is possible to fly with any one of the engines stopped, whether this be deliberately at the end of a voyage when the unballasting due to consumption of fuel allows therefor, or accidentally in course of flight, by reason of stoppage.

Having thus described my invention, what I claim as new and desire to secure by Letters Patent is—

In an aeroplane having a nacelle and a supporting plane therefor, the combination of an engine having a pulling propeller disposed in the front end of said nacelle, a second engine having a pulling propeller disposed in the same vertical plane with respect to said first engine, and a third engine having a pushing propeller coaxially disposed with respect to the line of action of said second engine, the axis of said coaxially disposed engines forming an angle of substantially 8° with the axis of said nacelle and upwardly inclined with respect to the first mentioned engine, whereby the line of travel of said aeroplane is unaffected upon stopping of any one of said three engines.

In testimony whereof I hereunto affix my signature.

ROMULUS BRATU.